(12) United States Patent
Shin

(10) Patent No.: US 10,502,315 B2
(45) Date of Patent: Dec. 10, 2019

(54) OIL PRESSURE SUPPLY SYSTEM OF AUTOMATIC TRANSMISSION

(71) Applicants: HYUNDAI MOTOR COMPANY, Seoul (KR); KIA MOTORS CORPORATION, Seoul (KR)

(72) Inventor: Yong Uk Shin, Suwon-si (KR)

(73) Assignees: Hyundai Motor Company, Seoul (KR); KIA Motors Corporation, Seoul (KR)

( * ) Notice: Subject to any disclaimer, the term of this patent is extended or adjusted under 35 U.S.C. 154(b) by 101 days.

(21) Appl. No.: 15/828,975

(22) Filed: Dec. 1, 2017

(65) Prior Publication Data

US 2019/0120371 A1 Apr. 25, 2019

(30) Foreign Application Priority Data

Oct. 19, 2017 (KR) .................. 10-2017-0135804

(51) Int. Cl.
*F16H 61/00* (2006.01)
*F16H 61/14* (2006.01)
(Continued)

(52) U.S. Cl.
CPC .......... *F16H 61/0031* (2013.01); *F15B 11/17* (2013.01); *F15B 13/027* (2013.01);
(Continued)

(58) Field of Classification Search
CPC .... F16H 61/0081; F16H 61/143; F16H 61/30; F16H 57/0412; F16H 57/0439; F16H 57/0446; F16H 2061/0037; F16H 61/0031; F16D 25/14; F15B 11/17; F15B 13/027; F15B 2211/20515; F15B 2211/20523; F15B 2211/20576; F15B 2211/526

See application file for complete search history.

(56) References Cited

U.S. PATENT DOCUMENTS 8,303,468 B2 * 11/2012 Shimizu .............. F16H 61/0031
477/130
9,108,499 B2 * 8/2015 Long ........................ B60K 6/48
(Continued)

FOREIGN PATENT DOCUMENTS

| JP | 2006316819 A | 11/2006 |
|---|---|---|
| JP | 5262653 B2 | 8/2013 |
| JP | 2015086771 A | 5/2015 |

*Primary Examiner* — Tinh T Dang
(74) *Attorney, Agent, or Firm* — Brinks Gilson & Lione

(57) ABSTRACT

The present disclosure provides an oil pressure supply system of an automatic transmission for a vehicle. The system may include: a mechanical oil pump; a line regulator valve configured to stably control the oil pressure supplied through the line pressure path and to supply the oil pressure to a first path; a torque converter control valve configured to control the oil pressure supplied through the first path and to supply the oil pressure to a second path and a third path; a torque converter lockup clutch control valve; an electric oil pump; a switch valve disposed on the seventh path and configured to open and close the oil pressure supplied to an eighth path; and a flow control valve configured to control a portion of the oil pressure supplied to the eighth path and to supply the portion of the oil pressure to the cooling/lubricating unit through a ninth path.

12 Claims, 5 Drawing Sheets

(51) Int. Cl.
    *F16H 61/30*     (2006.01)
    *F16H 57/04*     (2010.01)
    *F16D 48/02*     (2006.01)
    *F15B 13/02*     (2006.01)
    *F15B 11/17*     (2006.01)

(52) U.S. Cl.
    CPC ......... *F16D 48/02* (2013.01); *F16H 57/0412* (2013.01); *F16H 57/0439* (2013.01); *F16H 57/0446* (2013.01); *F16H 61/143* (2013.01); *F16H 61/30* (2013.01); *F15B 2211/20515* (2013.01); *F15B 2211/20523* (2013.01); *F15B 2211/20576* (2013.01); *F15B 2211/526* (2013.01); *F16D 25/14* (2013.01); *F16H 2061/0037* (2013.01)

(56) References Cited

U.S. PATENT DOCUMENTS

| | | | |
|---|---|---|---|
| 9,528,600 B2 * | 12/2016 | Moriyama | F16H 61/00 |
| 10,107,382 B2 * | 10/2018 | Tokozakura | F16H 57/0413 |
| 10,274,073 B1 * | 4/2019 | Shin | F16H 57/0413 |
| 2019/0048998 A1 * | 2/2019 | Harada | F16H 61/662 |
| 2019/0063598 A1 * | 2/2019 | Tsuchida | F16H 61/00 |
| 2019/0120371 A1 * | 4/2019 | Shin | F16H 61/0031 |
| 2019/0128399 A1 * | 5/2019 | Shin | F16H 57/0435 |

* cited by examiner

OIL PRESSURE SUPPLY SYSTEM OF AUTOMATIC TRANSMISSION

CROSS-REFERENCE TO RELATED APPLICATION

The present application claims priority to and the benefit of Korean Patent Application No. 10-2017-0135804, filed on Oct. 19, 2017, which is incorporated herein by reference in its entirety.

FIELD

The present disclosure relates to an oil pressure supply system of an automatic transmission for a vehicle, and more particularly, to an oil pressure supply system of an automatic transmission for a vehicle which is applied as an auxiliary function of an electric oil pump to reduce a load of a mechanical oil pump, thereby improving fuel efficiency.

BACKGROUND

The statements in this section merely provide background information related to the present disclosure and may not constitute prior art.

Due to today's high oil prices and strict emission regulations, automakers have been developing technologies that can enhance fuel efficiency in an environmentally friendly way.

Improvement of the fuel efficiency in an automatic transmission can be achieved through enhancement of power transmission efficiency. Likewise, improvement of power transmission efficiency can be implemented by reducing unnecessary consumption power of an oil pump.

However, in the related art, a system is configured in a way that oil pressure pumped in a mechanical pump is controlled by a pressure control valve and the oil pressure is distributed to each transmission unit. With this system configuration, flow rate cannot be controlled, and unnecessary power loss may occur.

Particularly, power loss that is caused by unnecessary oil pressure in a high RPM region may still occur, thereby reducing the fuel efficiency.

The above information disclosed in this section is only for enhancement of understanding of the background of the disclosure and therefore it may contain information that does not form the prior art that is already known in this country to a person of ordinary skill in the art.

SUMMARY

The present disclosure provides an oil pressure supply system of an automatic transmission for a vehicle, which applies a mechanical oil pump and an electric oil pump at the same time to allow oil of the electric oil pump to assist line pressure and torque converter pressure, cooling, and lubrication to reduce a load of the mechanical oil pump, thereby improving fuel efficiency.

One form of the present disclosure provides an oil pressure supply system of an automatic transmission, including: a mechanical oil pump driven by an engine, and configured to pump oil stored in an oil pan utilizing high oil pressure and to discharge oil pressure to a line pressure path; a line regulator valve configured to stably control the oil pressure that is supplied through the line pressure path and to supply the stably oil pressure to a first path; a torque converter control valve configured to control the oil pressure that is supplied through the first path and to supply the oil pressure to a second path and a third path; a torque converter lockup clutch control valve configured to supply the oil pressure supplied through the second path to lock-up clutch operating and non-operating chambers of a torque converter through a fourth path and a fifth path and supply the oil pressure supplied through the third path to a cooling/lubricating unit through a sixth path; an electric oil pump configured to pump the oil stored in the oil pan by the high oil pressure and to discharge the oil to a seventh path when necessary; a switch valve disposed on the seventh path and configured to open and close the oil pressure supplied to an eighth path; and a flow control valve configured to control a portion of the oil pressure supplied to the eighth path and to supply the portion of the oil pressure to the cooling/lubricating unit through a ninth path, and the seventh path is connected with the line pressure path through a first check valve, the eighth path is connected with the second path through a second check valve, and the sixth path is merged with the second path and the sixth path is connected with the ninth path through a third check valve.

The line regulator valve may be controlled by the oil pressure of the line pressure path applied to one end of the line regulator valve, control pressure of a first solenoid valve applied to the other end of the line regulator valve, and elastic force of an elastic member, wherein the line regulator valve comprises a spool valve The torque converter control valve may be configured to move the spool valve laterally with the control pressure of the first solenoid valve applied to one end of the torque converter control valve and with feedback oil pressure of the torque converter control valve applied to the other end of the torque converter control valve, and recirculate, through a recirculation path, a portion of the oil pressure supplied through the first path to a suction path of the mechanical oil pump, wherein the torque converter control valve comprises the spool valve.

The first solenoid valve may include a N/L type variable control solenoid valve that does not form the oil pressure in a normal state.

The torque converter lock-up clutch control valve may be controlled by: control pressure of a second solenoid valve applied to one end of the torque converter lock-up clutch control valve; and feedback oil pressure of the lock-up clutch non-operating chamber, oil pressure of the second path applied to the other end of the torque converter lock-up clutch control valve, and the elastic force of the elastic member.

The second solenoid valve may include the N/L type variable control solenoid valve that does not form the oil pressure in the normal state.

The switch valve may be controlled by control pressure of a third solenoid valve applied to one end of the switch valve and the elastic force of the elastic member disposed at the other end of the switch valve, wherein the switch valve comprises the spool valve.

The third solenoid valve may include the N/L type variable control solenoid valve that does not form the oil pressure in the normal state.

The flow control valve may be controlled by oil pressure of the second path applied to one end of the flow control valve, oil pressure supplied to the cooling/lubricating unit applied to the other end of the flow control valve, and the elastic force of the elastic member, wherein the flow control valve comprises the spool valve.

The flow control valve may be controlled by oil pressure of the second path applied to one end of the flow control valve, control pressure of the first solenoid valve applied to the other end of the flow control valve, and oil pressure supplied to the cooling/lubricating unit, wherein the flow control valve comprises the spool valve.

The first check valve may be configured to interrupt the flow of the oil pressure from the line pressure path to the seventh path, the second check valve may be configured to interrupt the flow of the oil pressure from the second path to the eighth path, and the third check valve may be configured to interrupt the flow of the oil pressure from the ninth path to the sixth path.

An orifice may be disposed at a previous point merged with the sixth path on the second path.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
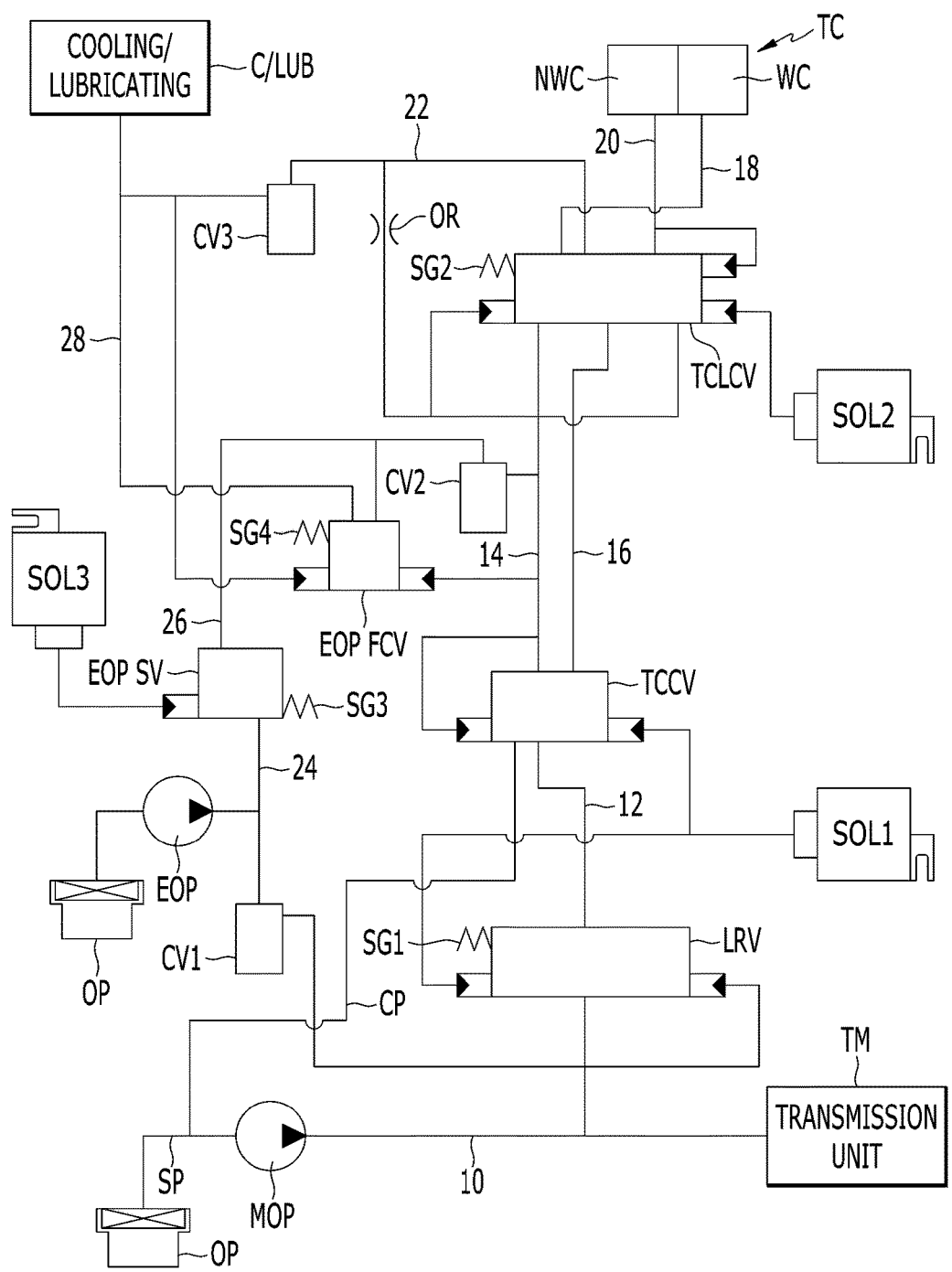
FIG. 1 is an oil pressure circuit diagram of an oil pressure supply system.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The present disclosure will be described more fully hereinafter with reference to the accompanying drawings, in which exemplary forms of the disclosure are shown. As those skilled in the art would realize, the described forms may be modified in various different ways, all without departing from the spirit or scope of the present disclosure.

The drawings and description are to be regarded as illustrative in nature and not restrictive and like reference numerals designate like elements throughout the specification.

In the following description, dividing names of components into first, second and the like is to divide the names because the names of the components are the same as each other and an order thereof is not particularly limited.

FIG. 1 is an oil pressure circuit diagram of an oil pressure supply system in a first form of the present disclosure.

Referring to FIG. 1, the oil pressure supply system in the first form of the present disclosure includes a mechanical oil pump MOP, an electric oil pump EOP, a line regulator valve LRV, a torque converter control valve TCCV, a torque converter lock-up clutch control valve (TCLCV), first, second, and third solenoids valves SOL1, SOL2, and SOL3, a switch valve EOP SV, a flow control valve EOP FCV, and first, second, and third check valves CV1, CV2, and CV3 and oil pressure pumped from the mechanical oil pump MOP and the electric oil pump EOP may be supplied to a transmission unit TM, a torque converter TC, and a cooling lubricating unit C/LUB.

The mechanical oil pump MOP is driven by an engine. When the engine is driven, the mechanical oil pump MOP is continuously driven to pump a fluid stored in an oil pan OP and discharge the pumped fluid to a line pressure pipe 10.

The line regulator valve LRV stably controls the oil pressure supplied through the line pressure line 10 and supplies the oil pressure to the transmission unit TM and the torque converter control valve TCCV.

The line regulator valve LRV is configured by a spool valve built in a valve body so as to move to the left and right and controlling an opening area of each port. The oil pressure is controlled while the valve spool moves left and right by the oil pressure of the line pressure pipe 10 applied to one side end, control pressure of the first solenoid valve SOL1 applied to the opposite side so as to be opposite to the oil pressure of the line pressure pipe 10, and elastic force of an elastic member SG1.

The torque converter control valve TCCV controls the oil pressure supplied from the line regulator valve LRV through a first path 12 and supplies the controlled oil pressure to the torque converter lockup clutch control valve TCLCV through second and third paths 14 and 16.

The torque converter control valve TCCV is configured by the spool valve built in the valve body so as to move to the left and right and controlling the opening area of each port, and the oil pressure controlled by the control pressure of the first solenoid valve (SOL1) applied to one side end and feedback oil pressure of the torque converter control valve TCCV applied to the opposite side to be opposite to the control pressure of the first solenoid valve SOL1 and supplied through the first path 12 is controlled and supplied to the second and third paths 14 and 16.

In a control process of the torque converter control valve TCCV, some of the oil pressure supplied through the first flow path 12 is recirculated to a suction path SP through a recirculation path CP.

The torque converter lockup clutch control valve TCLCV switches a path so as to selectively supply the oil pressure from the torque converter control valve TCCV through the second and third paths 14 and 16 to a lock-up clutch operating chamber WC or a lock-up clutch non-operating chamber NWC of the torque converter TC through fourth and fifth paths 18 and 20 or supply the oil pressure to the cooling/lubricating unit C/LUB through a sixth path 22.

The torque converter lockup clutch control valve TCLCV is configured by the spool valve built in the valve body so as to move to the left and right and controlling the opening area of each port, and is configured to supply the oil pressure through the second path 14 to the lock-up clutch operating chamber WC or the lock-up clutch non-operating chamber NWC of the torque converter TC or selectively supply the oil pressure supplied through the third path 16 to the cooling/lubricating C/LUB while the spool valve moves to the left and right by the control pressure of the second solenoid valve SOL2, the feedback oil pressure of the lock-up clutch non-operating chamber NWC, the control pressure of the second solenoid valve SOL2, the oil pressure of the second path 14 applied to the opposite side so as to be opposite to the feedback oil pressure, and the elastic force of an elastic member SG2.

While the mechanical oil pump MOP is controlled by a transmission control unit (not illustrated), the mechanical oil pump MOP pumps the fluid stored in the oil pan OP and discharges the pumped fluid to a seventh path 24.

The seventh flow path 24 is connected to the line pressure pipe 10 and connected to the switch valve EOP SV through the first check valve CV1.

The switch valve EOP SV is configured by the spool valve built in the valve body so as to move to the left and right. The switch valve EOP SV is configured to supply the oil pressure supplied through the seventh path 24 to an eighth path 26 while the valve spool moves to the left and right by the control pressure of the third solenoid valve SOL3 applied to one side end and the elastic force of the elastic member SG3 disposed at the opposite side to be opposite to the control pressure of the third solenoid valve SOL3.

The eighth path 26 is formed to supply the supplied oil pressure to the second path 14 through the second check valve CV2 and to supply the oil pressure to the flow control valve EOP FCV.

The flow control valve EOP FCV is configured by the spool valve built in the valve body so as to move to the left and right. The flow control valve EOP FCV is configured to supply the oil pressure supplied through the eighth path 26 to a ninth path 28 while the valve spool moves to the left and right by the oil pressure of the second path 14 applied to one side end, the oil pressure supplied to the cooling/lubricating unit C/LUB applied to the opposite side to be opposite to the oil pressure of the second path 14, and the elastic force of an elastic member SG4.

The third check valve CV3 is disposed between the path after the second path 14 and the sixth path 22 are merged and the ninth path 28 and an orifice OR is disposed at a previous point merged with the sixth path 22 on the second path 14 to control flow rate which flows from the second path 14 to the sixth path 22.

The first check valve CV1 is configured to interrupt the flow of the oil pressure from the line pressure pipe 10 to the seventh path 24, the second check valve CV2 is configured to interrupt the flow from the second path 14 to the eighth path 26, and the third check valve CV3 is configured to interrupt the flow of the oil pressure from the ninth path 28 to the sixth path 22.

The first, second, and third solenoid valves SOL1, SOL2, and SOL3 are configured by N/L type variable control solenoid valves that do not form the oil pressure in a normal state.

The transmission unit TM refers to a planetary gear train that forms a speed change stage in accordance with operating conditions. Shifting of the planetary gear train is made according to a plurality of planetary gear sets as well known in the art, a clutch which is a coupling component selectively connecting each rotary component of the planetary gear set or fixing each rotary component to a transmission housing, and the oil pressure supplied to a brake.

Figure 2:
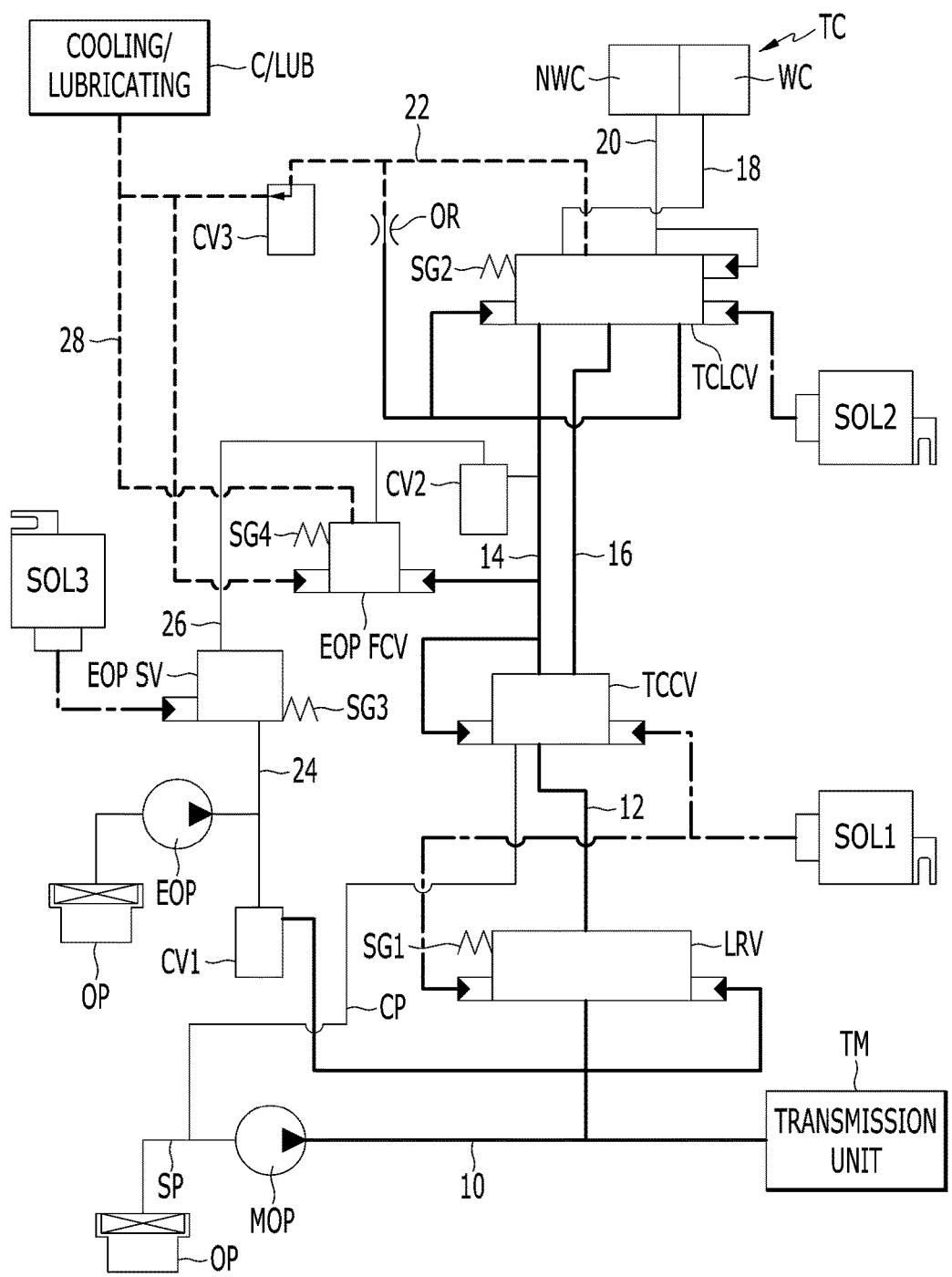
FIG. 2 is a flowchart of oil pressure when only a mechanical oil pump is driven in the oil pressure supply system.

FIG. 2 is a flowchart of oil pressure when only a mechanical oil pump is driven in the oil pressure supply system in the first form of the present disclosure.

Referring to FIG. 2, the oil pressure pumped by the mechanical oil pump MOP is controlled to a stable oil pressure by the line regulator valve LRV and supplied to the torque converter control valve TCCV.

The torque converter control valve TCCV supplies the oil pressure supplied from the line regulator valve LRV through the first path 12 to the torque converter lockup clutch control valve TCLCV through second and third paths 14 and 16 according to a control condition.

In the torque converter lockup clutch control valve TCLCV, the oil pressure supplied from the torque converter control valve TCCV through the second and third flow paths 14 and 16 is supplied to the lockup clutch operating chamber WC or the lock-up clutch non-operating side chamber (NWC) in accordance with the control condition.

Further, the oil pressure supplied through the third path 16 is selectively supplied to the cooling/lubricating unit C/LUB.

Figure 3:
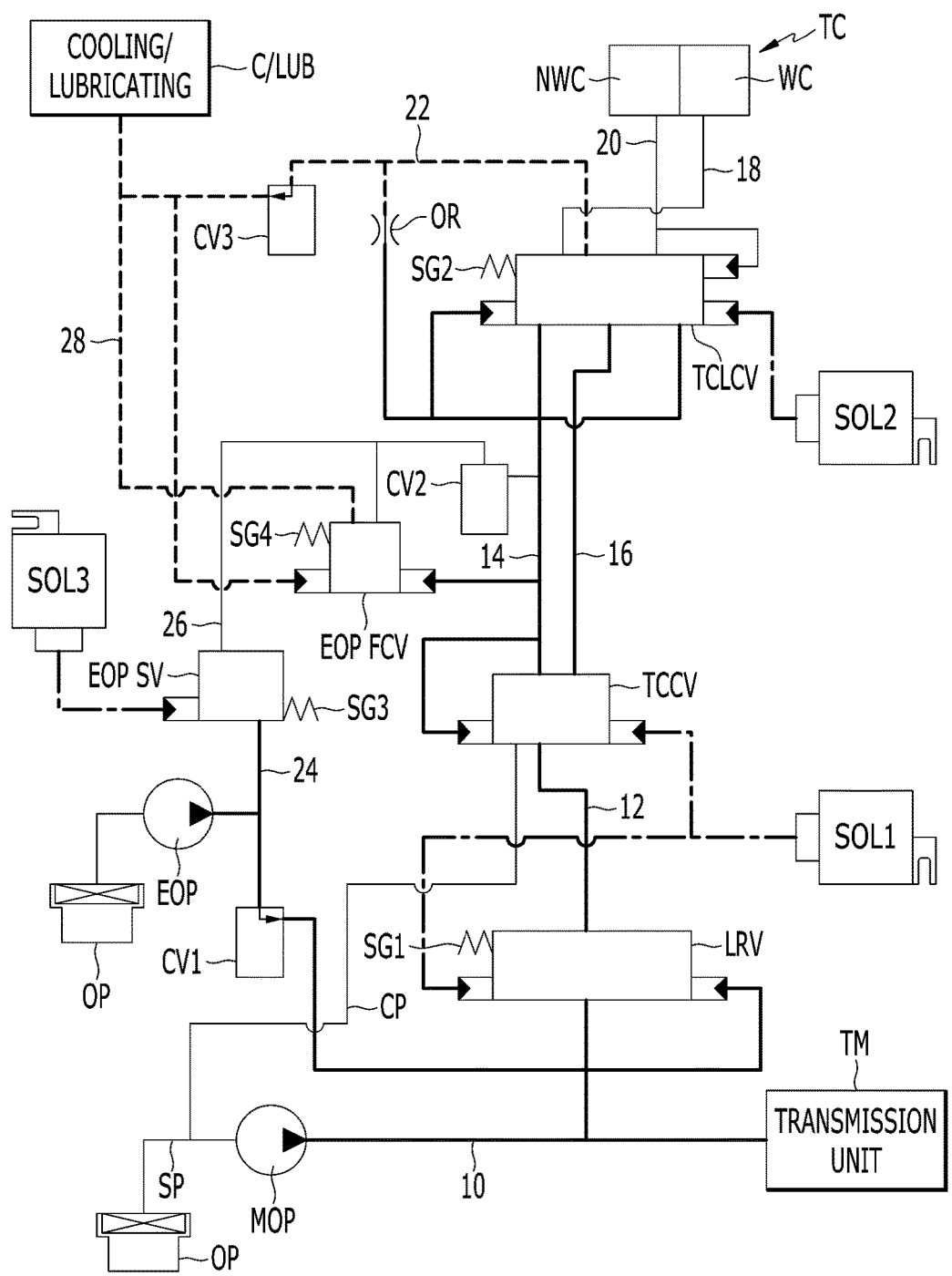
FIG. 3 is a flowchart of oil pressure when oil pressure of an electric oil pump is supplied as line pressure while the mechanical oil pump and the electric oil pump are simultaneously driven in the oil pressure supply system.

FIG. 3 is a flowchart of oil pressure when oil pressure of an electric oil pump is supplied as line pressure while the mechanical oil pump and the electric oil pump are simultaneously driven in the oil pressure supply system in the first form of the present disclosure.

Referring to FIG. 3, when the flow rate supplied from the mechanical oil pump MOP is small due to a low speed operation in the oil pressure supply process illustrated in FIG. 2, the electric oil pump EOP is driven and controlled.

When the third solenoid valve SOL3 is controlled to be in an OFF state, the oil pressure generated in the electric oil pump EOP is supplied to the line pressure pipe 10 through the first check valve CV1.

As a result, the flow rate of the mechanical oil pump MOP is assisted to supply sufficient oil pressure.

Figure 4:
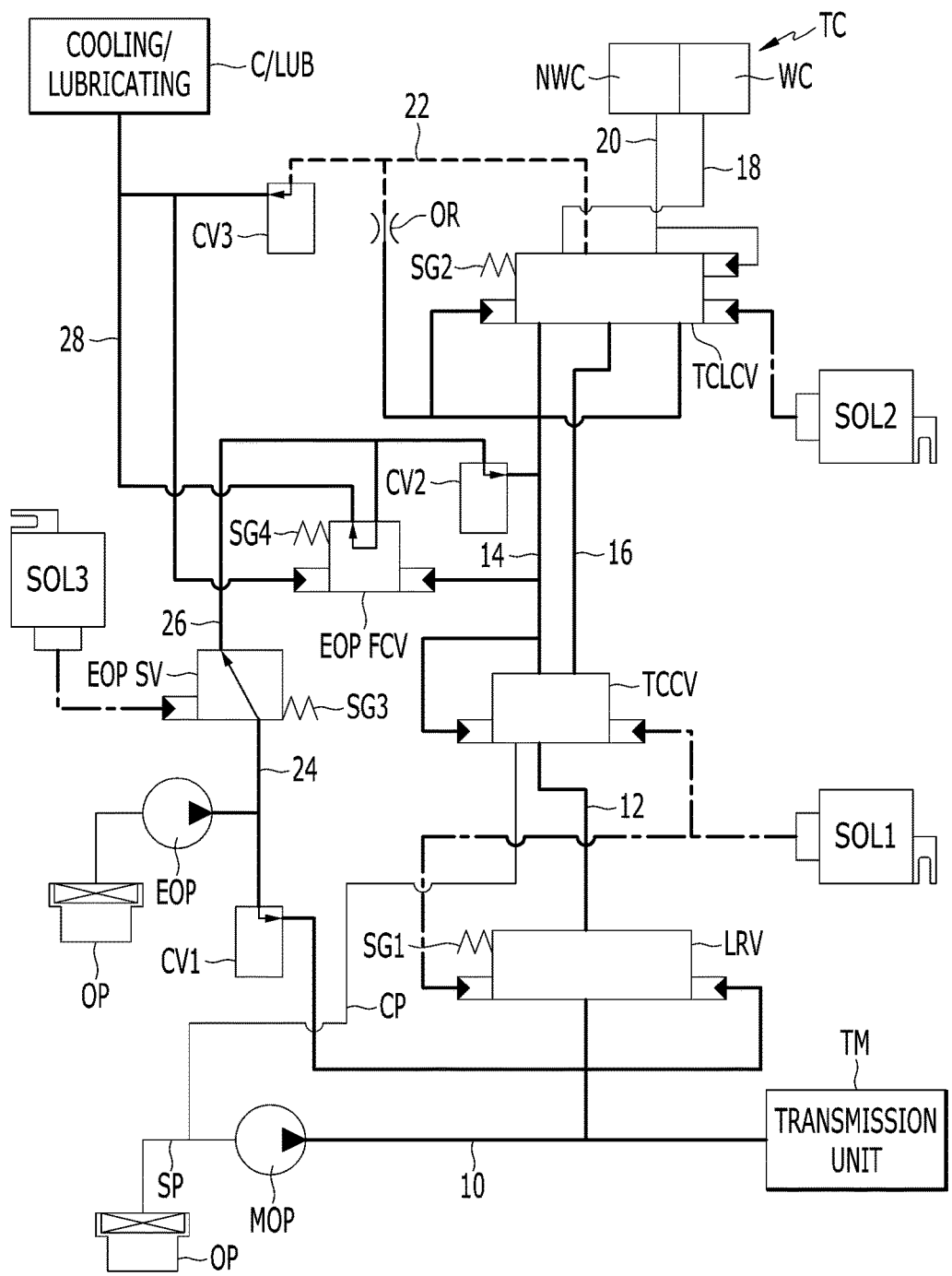
FIG. 4 is a flowchart of oil pressure when the oil pressure of the electric oil pump is supplied as the line pressure and cooling/lubricating oil pressure while the mechanical oil pump and the electric oil pump are simultaneously driven in the oil pressure supply system.

FIG. 4 is a flowchart of oil pressure when the oil pressure of the electric oil pump is supplied as the line pressure and cooling/lubricating oil pressure while the mechanical oil pump and the electric oil pump are simultaneously driven in the oil pressure supply system in the first form of the present disclosure.

Referring to FIG. 4, during the oil pressure supply process illustrated in FIG. 3, when pressure of the torque converter and the oil pressure supplied to the cooling/lubricating unit (C/LUB) are insufficient, the third solenoid valve SOL3 is controlled to be turned on.

Then, some of the oil pressure generated from the electric oil pump EOP is supplied to the second path 14 through the second check valve CV2 by passing through the switch valve SV to assist the torque converter pressure and the oil pressure supplied to the flow control valve EOP FCV is supplied to the cooling/lubricating unit C/LUB through the ninth path 28 in accordance with path switching of the flow control valve EOP FCV.

In this case, the oil pressure supplied to the second path 14 is not supplied to the torque converter lockup clutch control valve TCLCV through only the second path 14, but may be supplied to the torque converter control valve TCCV through the third path 16 by controlling the torque converter lock-up clutch control valve TCLCV.

In FIGS. 3 and 4, the oil pressure flow downstream of the torque converter lockup clutch control valve TCLCV is not illustrated because the oil pressure of the second path 14 may be supplied to the lock-up clutch operating chamber WC and the non-operating chamber NWC of the torque converter TC according to the control condition of the torque converter lock-up clutch control valve TCLCV.

Figure 5:
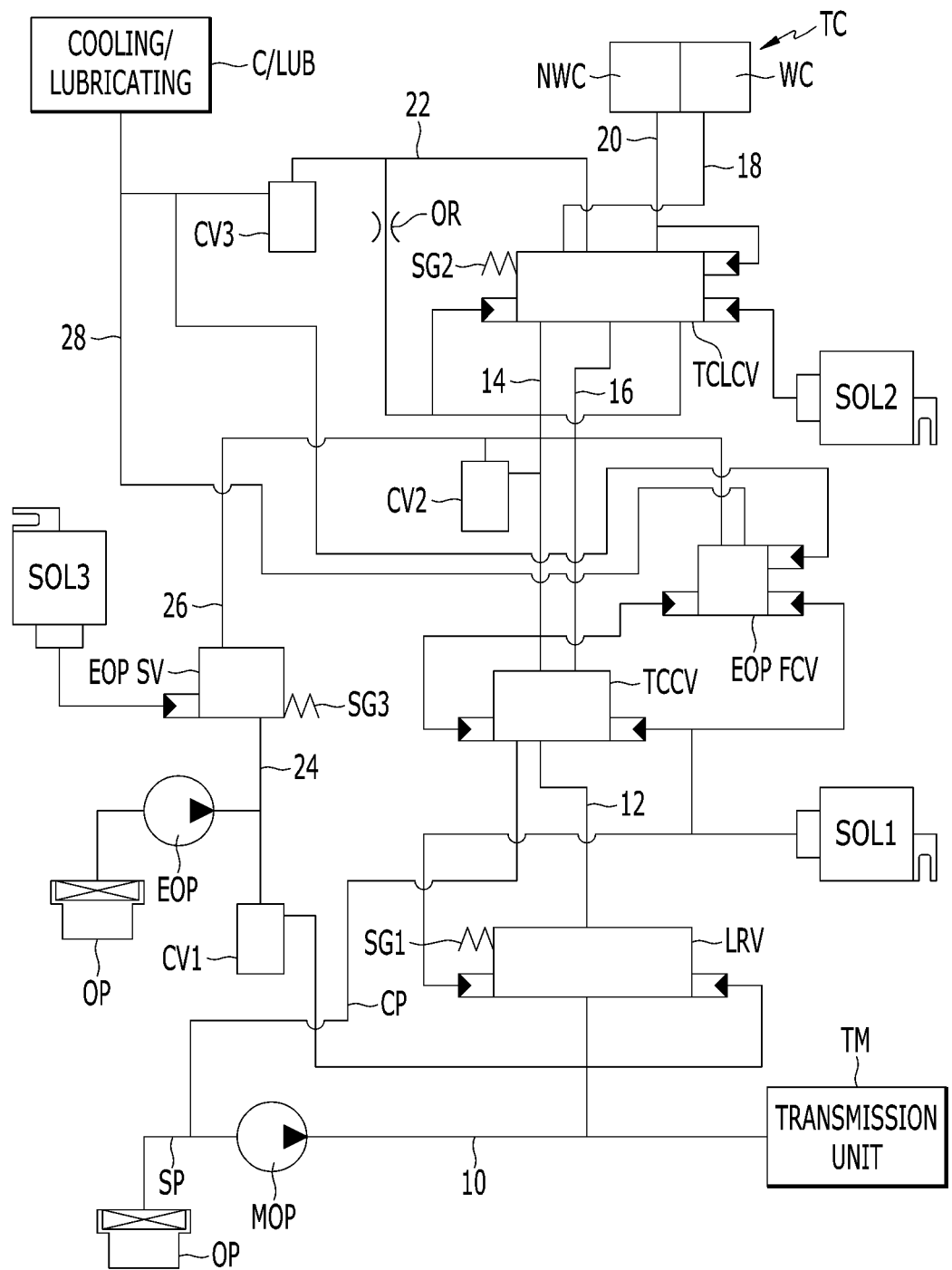
FIG. 5 is an oil pressure circuit diagram of an oil pressure supply system.

FIG. 5 is an oil pressure circuit diagram of an oil pressure supply system in a second form of the present disclosure.

Referring to FIG. 5, the oil pressure supply system in the second form of the present disclosure is configured similarly to the hydraulic pressure supply system in the first form of the present disclosure, except for the control method of the flow control valve (EOP FCV).

More specifically, the flow control valve EOP FCV in the first form of the present disclosure is configured to supply the oil pressure supplied through the eighth path 26 to the ninth path 28 while the valve spool moves to the left and right by the oil pressure of the second path 14 applied to one end, the oil pressure supplied to the cooling/lubricating unit C/LUB applied to the opposite side to be opposite to the oil pressure of the second path 14, and the elastic force of the elastic member SG4.

However, the flow control valve EOP FCV in the second form of the present disclosure is configured to supply the oil pressure supplied through the eighth path 26 to the ninth path 28 while the valve spool moves to the left and right by the oil pressure of the second path 14 applied to one end, the oil pressure supplied to the cooling/lubricating unit C/LUB applied to the opposite side to be opposite to the oil pressure of the second path 14, and the control pressure of the first solenoid valve SOL1.

Since the second form differs from the first form only in the control method of the flow control valve EOP FCV, but the other configurations and operations are the same as those of the first form, a detailed description thereof will be omitted.

As described above, in the oil pressure supply system of an automatic transmission for a vehicle in some forms of the present disclosure, when the flow rate of the mechanical oil pump is low that could be possibly caused by low-speed driving or when a driving load of the mechanical pump increases while the oil pressure is excessively generated from the mechanical oil pump due to high-speed driving, the driving load of the mechanical oil pump may be reduced by recirculating some of the oil pressure supplied from the mechanical oil pump. Also, insufficient oil pressure may be supplemented by driving the electric oil pump to stably supply the oil pressure. Accordingly, the system in some forms of the present disclosure may reduce driving loss of the mechanical oil pump, thereby enhancing the fuel efficiency.

Further, the oil pressure supply system of an automatic transmission for a vehicle in some forms of the present disclosure may assist the pressure of the torque converter by the oil pressure of the electric oil pump when the pressure of the torque converter is insufficient (medium RPM region and high-pressure region of the line pressure) to reduce a capacity of the mechanical oil pump, thereby enhancing the fuel efficiency.

In addition, the oil pressure supply system of an automatic transmission for a vehicle in some forms of the present disclosure may assist insufficient cooling and lubricating flow rate with the oil pressure of the electric oil pump when the control pressure and the pressure of the torque converter are formed, but the cooling and lubricating flow rate is insufficient. Accordingly, the system may reduce the capacity of the mechanical oil pump, thereby enhancing the fuel efficiency and durability of the automatic transmission.

The description of the disclosure is merely exemplary in nature and thus, variations that do not depart from the substance of the disclosure are intended to be within the scope of the disclosure. Such variations are not to be regarded as a departure from the spirit and scope of the disclosure.

What is claimed is:

1. An oil pressure supply system of an automatic transmission, the system comprising:
   a mechanical oil pump configured to pump oil that is stored in an oil pan utilizing high oil pressure and to discharge oil pressure to a line pressure path, wherein the mechanical oil pump is driven by an engine;
   a line regulator valve configured to stably control the oil pressure that is supplied through the line pressure path and to supply the oil pressure to a first path;
   a torque converter control valve configured to control the oil pressure that is supplied through the first path and to supply the oil pressure to a second path and a third path;
   a torque converter lockup clutch control valve configured to:
      supply the oil pressure supplied through the second path to lock-up clutch operating chamber and lock-up clutch non-operating chamber of a torque converter through a fourth path and a fifth path; and
      supply the oil pressure supplied through the third path to a cooling/lubricating unit through a sixth path;
   an electric oil pump configured to pump the oil stored in the oil pan by the high oil pressure and to discharge the oil pressure to a seventh path when necessary;
   a switch valve configured to open and close the oil pressure supplied to an eighth path, wherein the switch valve is disposed on the seventh path; and
   a flow control valve configured to control a portion of the oil pressure supplied to the eighth path and to supply the portion of the oil pressure to the cooling/lubricating unit through a ninth path,
   wherein the seventh path is connected with the line pressure path through a first check valve,
   wherein the eighth path is connected with the second path through a second check valve, and
   wherein the sixth path is merged with the second path and the sixth path is connected with the ninth path through a third check valve.

2. The oil pressure supply system of claim 1, wherein the line regulator valve is controlled by:
   the oil pressure of the line pressure path that is applied to one end of the line regulator valve;
   control pressure of a first solenoid valve that is applied to the other end of the line regulator valve; and
   elastic force of an elastic member,
   wherein the line regulator valve comprises a spool valve.

3. The oil pressure supply system of claim 1, wherein torque converter control valve is configured to:
   move the spool valve laterally with the control pressure of the first solenoid valve that is applied to one end of the torque converter control valve and with feedback oil pressure of the torque converter control valve that is applied to the other end of the torque converter control valve; and
   recirculate, through a recirculation path, a portion of the oil pressure supplied through the first path to a suction path of the mechanical oil pump,
   wherein the torque converter control valve comprises the spool valve.

4. The oil pressure supply system of claim 2, wherein the first solenoid valve comprises:
   a variable control solenoid valve that is not configured to form oil pressure in a normal state.

5. The oil pressure supply system of claim 1, wherein the torque converter lock-up clutch control valve is controlled by:
   control pressure of a first solenoid valve that is applied to one end of the torque converter lock-up clutch control valve;

feedback oil pressure of the lock-up clutch non-operating chamber;

oil pressure of the second path that is applied to the other end of the torque converter lock-up clutch control valve; and the elastic force of an elastic member, wherein the torque converter lock-up clutch control valve comprises a spool valve.

6. The oil pressure supply system of claim 5, wherein the second solenoid valve comprises:

the variable control solenoid valve that is not configured to form the oil pressure in the normal state.

7. The oil pressure supply system of claim 1, wherein the switch valve is controlled by:

control pressure of a first solenoid valve that is applied to one end of the switch valve; and the elastic force of an elastic member that is disposed at the other end of the switch valve, wherein the switch valve comprises a spool valve.

8. The oil pressure supply system of claim 7, wherein the third solenoid valve comprises:

the variable control solenoid valve that is not configured to form the oil pressure in the normal state.

9. The oil pressure supply system of claim 1, wherein the flow control valve is controlled by:

oil pressure of the second path that is applied to one end of the flow control valve;

oil pressure supplied to the cooling/lubricating unit that is applied to the other end of the flow control valve; and the elastic force of an elastic member, wherein the flow control valve comprises a spool valve.

10. The oil pressure supply system of claim 1, wherein the flow control valve is controlled by:

oil pressure of the second path that is applied to one end of the flow control valve;

control pressure of the first solenoid valve that is applied to the other end of the flow control valve; and oil pressure supplied to the cooling/lubricating unit, wherein the flow control valve comprises a spool valve.

11. The oil pressure supply system of claim 1, wherein:

the first check valve is configured to interrupt a flow of oil pressure from the line pressure path to the seventh path, the second check valve is configured to interrupt a flow of oil pressure from the second path to the eighth path, and the third check valve is configured to interrupt a flow of oil pressure from the ninth path to the sixth path.

12. The oil pressure supply system of claim 1, wherein:

an orifice is disposed on the second path at a point before the second path merges with the sixth path.

* * * * *